(12) United States Patent
Williams et al.

(10) Patent No.: US 9,925,944 B2
(45) Date of Patent: Mar. 27, 2018

(54) AIRBAG CUSHION MOUNTING AND/OR ORIENTATION FEATURES

(71) Applicant: Autoliv ASP, Inc., Ogden, UT (US)

(72) Inventors: Jeffrey D. Williams, Roy, UT (US); Derrick R. Staheli, South Ogden, UT (US); Mark S. Hatfield, Providence, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 123 days.

(21) Appl. No.: 14/834,281

(22) Filed: Aug. 24, 2015

(65) Prior Publication Data

US 2017/0057450 A1 Mar. 2, 2017

(51) Int. Cl.
*B60R 21/217* (2011.01)

(52) U.S. Cl.
CPC .................. *B60R 21/217* (2013.01)

(58) Field of Classification Search
CPC ..................................... B60R 21/217
USPC ...................................... 280/728.2
See application file for complete search history.

(56) References Cited

U.S. PATENT DOCUMENTS

| 3,772,062 A | 11/1973 | Shur et al. |
| 3,843,010 A | 10/1974 | Morse et al. |
| 3,874,544 A | 4/1975 | Harmon |
| 3,969,812 A | 7/1976 | Beck |
| 4,640,312 A | 2/1987 | Patell et al. |
| 4,835,975 A | 6/1989 | Windecker |
| 4,865,210 A | 9/1989 | Brainard, II |
| 4,877,264 A | 10/1989 | Cuevas |
| 4,913,461 A | 4/1990 | Cuevas |
| 4,982,870 A | 1/1991 | Van Loon |
| 4,988,119 A * | 1/1991 | Hartmeyer ............ B60R 21/217 141/313 |
| 5,028,070 A | 7/1991 | Bender |
| 5,062,367 A | 11/1991 | Hayashi et al. |
| 5,100,171 A | 3/1992 | Faigle et al. |
| 5,264,059 A | 11/1993 | Jacaruso et al. |

(Continued)

FOREIGN PATENT DOCUMENTS

| DE | 20308650 | 10/2003 |
| DE | 102009006077 | 7/2010 |

OTHER PUBLICATIONS

Concise Explanation of Relevance of DE102009006077.

(Continued)

*Primary Examiner* — Karen Beck
(74) *Attorney, Agent, or Firm* — Phillips Ryther & Winchester; Matthew D. Thayne

(57) ABSTRACT

Airbag cushion assemblies comprising cushion orientation features and related methods. Some embodiments may comprise an airbag cushion comprising a throat region comprising an inflator opening. An inflator comprising an inflator collar may be coupled with the airbag cushion. The inflator collar may comprise a non-circular shape. The assembly may further comprise an inflator coupling member coupled with the airbag cushion at the inflator opening. The inflator coupling member may similarly comprise a non-circular opening configured to be aligned with the inflator opening and to mate with the non-circular shape of the inflator collar so as to prevent the inflator from being coupled with the airbag cushion in a non-desired rotational orientation.

24 Claims, 7 Drawing Sheets

(56) References Cited

U.S. PATENT DOCUMENTS

| | | | |
|---|---|---|---|
| 5,320,379 A * | 6/1994 | Burnard | B60R 21/276 280/728.2 |
| 5,340,148 A | 8/1994 | Faigle et al. | |
| 5,423,568 A | 6/1995 | Zushi et al. | |
| 5,431,432 A | 7/1995 | Webber et al. | |
| 5,454,588 A * | 10/1995 | Rose | B60R 21/2171 280/728.2 |
| 5,492,364 A | 2/1996 | Anderson et al. | |
| 5,547,213 A | 8/1996 | Lang et al. | |
| 5,613,700 A * | 3/1997 | Hiramitsu | B60R 21/217 280/728.2 |
| 5,671,946 A | 9/1997 | Whalen et al. | |
| 5,791,682 A * | 8/1998 | Hiramitsu | B60R 21/217 280/728.2 |
| 5,931,491 A | 8/1999 | Bosgeiter et al. | |
| 6,145,872 A | 11/2000 | Soderquist et al. | |
| 6,149,184 A | 11/2000 | Ennis et al. | |
| 6,328,332 B1 | 12/2001 | Schutz | |
| RE38,494 E | 4/2004 | Kirker et al. | |
| 7,147,124 B2 | 12/2006 | Minta et al. | |
| 7,175,894 B2 | 2/2007 | Nakamura | |
| 7,438,315 B2 | 10/2008 | Blackburn | |
| 7,516,983 B2 | 4/2009 | Suehiro et al. | |
| 7,597,353 B2 | 10/2009 | Smith et al. | |
| 7,905,516 B2 | 3/2011 | Bostick et al. | |
| 8,196,952 B2 * | 6/2012 | Walston | B60R 21/2171 280/728.2 |
| 8,297,653 B2 | 10/2012 | Smith | |
| 8,820,779 B1 * | 9/2014 | Low | B60R 21/232 280/728.2 |
| 2004/0235378 A1 | 11/2004 | Byma et al. | |
| 2005/0225064 A1 | 10/2005 | Suehiro et al. | |
| 2006/0060325 A1 | 3/2006 | Gordon et al. | |
| 2006/0267322 A1 | 11/2006 | Eckelberg | |
| 2007/0125488 A1 | 6/2007 | Bisson et al. | |
| 2012/0234839 A1 | 9/2012 | Smith et al. | |
| 2012/0235392 A1 | 9/2012 | Smith | |
| 2014/0144343 A1 | 5/2014 | Smith et al. | |
| 2015/0130168 A1 * | 5/2015 | Vinssac | B60R 21/213 280/728.2 |
| 2015/0307050 A1 * | 10/2015 | Smith | B60R 21/217 280/728.2 |
| 2016/0039381 A1 * | 2/2016 | Hatfield | B60R 21/217 280/728.2 |

OTHER PUBLICATIONS

Concise Explanation of Relevance of DE20308650.
International Search Report for PCT/US15/026909, dated Jul. 15, 2015, 2 pgs.
Written Opinion for PCT/US15/026909, dated Jul. 15, 2015, 7 pgs.

* cited by examiner

AIRBAG CUSHION MOUNTING AND/OR ORIENTATION FEATURES

SUMMARY

For certain airbag modules, the airbag cushion may be a floating cushion that uses the inflator as the anchor to the housing and module. It may therefore be desirable to restrict the rotational orientation of the cushion relative to the inflator and/or other components of the module. However, the fabric material of most airbag cushions is too pliable to create any positive orientation control.

The present inventors have therefore determined that it would be desirable to provide systems and methods that overcome one or more of the foregoing limitations and/or other limitations of the prior art. For example, the present inventors have determined that, by providing, in some embodiments, a feature that can be coupled with an airbag cushion to prevent, or at least inhibit, the cushion from being assembled in an incorrect or undesirable orientation, various limitations of the prior art may be improved.

In a more particular example of an airbag cushion assembly according to some embodiments, the assembly may comprise an airbag cushion comprising a throat region comprising an inflator opening. The assembly may further comprise an inflator comprising a base. In some embodiments, the inflator base may comprise an inflator collar. The inflator may be coupled with the airbag cushion. The inflator base/collar may comprise a non-circular shape, and the inflator collar may extend through the inflator opening.

Some embodiments may further comprise an inflator coupling member coupled with the airbag cushion at the inflator opening. The inflator coupling member may comprise an opening configured to be aligned with the inflator opening. This opening may also comprise a non-circular shape configured to mate with the non-circular shape of the inflator collar so as to prevent the inflator from being coupled with the airbag cushion in a non-desired rotational orientation. In some such embodiments, the inflator coupling member and/or inflator may be configured to allow for coupling between the airbag cushion, inflator, and/or inflator coupling member in only a single rotational orientation.

Preferably, the inflator coupling member comprises a material having a stiffness greater than a material defining the airbag cushion so as to allow for creating the desired positive orientation control.

In some embodiments, the airbag cushion may comprise one or more pockets configured to receive at least a portion of the inflator coupling member. In some such embodiments, the pocket may be formed by adjacent layers of a fabric material of the airbag cushion. For example, in some embodiments, a patch may be applied to an internal and/or external surface of the cushion adjacent to the inflator opening to apply such pocket(s).

In some embodiments, the inflator coupling member may comprise at least one leg, and the pocket may be configured to receive the at least one leg to maintain the inflator coupling member in a preconfigured rotational orientation with respect to the airbag cushion. In some such embodiments, the inflator coupling member may comprise two opposing legs. In some such embodiments, the pocket may comprise a first region configured to receive a first leg of the two opposing legs, and a second region configured to receive a second leg of the two opposing legs.

In some embodiments, one or more of the legs may comprise a barb. In some such embodiments, the pocket may comprise a barb-receiving portion configured to receive the barb to prevent the at least one leg from being removed from the pocket.

In some embodiments, the one or more legs may be configured to be positioned in a first configuration with respect to a body of the inflator coupling member, and may be configured to be positioned in a second configuration with respect to the body, and wherein one or more of the legs (in some cases, all) are resiliently biased towards the first configuration. In some such embodiments, the leg(s) may be configured to flex from the first configuration in which the leg(s) extends at a first distance from the body to the second configuration in which the leg(s) extends at a second distance from the body, wherein the first distance is greater than the second distance. This may be accomplished, for example, by making one or more of the legs spring-loaded, or making them resiliently flexible.

In some embodiments, the inflator coupling member may be coupled with the airbag cushion using at least one of a sew/stitch line and an adhesive. In some such embodiments, the sew/stitch line may be applied directly to the inflator coupling member and through the fabric of the cushion.

In another example of an airbag cushion assembly according to other embodiments, the assembly may comprise an airbag cushion comprising an opening, and an inflator coupled with the airbag cushion, wherein at least a portion of the inflator is configured to be received in the opening. The assembly may further comprise means for restricting a rotational orientation of the inflator with respect to the airbag cushion.

The means for restricting a rotational orientation of the inflator with respect to the airbag cushion may comprise an inflator coupling member coupled with the airbag cushion at the opening. In some such embodiments, the inflator coupling member may comprise an insert comprising an insert opening configured to be aligned with the opening of the airbag cushion. The insert opening may comprise a non-circular shape, and the at least a portion of the inflator may similarly comprise a non-circular shape configured to mate with the non-circular shape of the insert opening so as to prevent the inflator from being coupled with the airbag cushion in a non-desired rotational orientation. In some embodiments, the means for restricting a rotational orientation of the inflator with respect to the airbag cushion may be configured to allow the inflator to be coupled to the airbag cushion in only a single rotational orientation.

In some embodiments, the airbag cushion may comprise a pocket configured to receive at least a portion of the insert.

In some embodiments, the means for restricting a rotational orientation of the inflator with respect to the airbag cushion may be stitched, sewn or applied to the airbag cushion about the opening using an adhesive.

In an example of an airbag cushion according to some embodiments, the cushion may comprise a first fabric layer; an inflator opening formed in the first fabric layer; and a pocket. In some embodiments, the pocket may be formed at least in part by the first fabric layer, and/or may be formed adjacent to the inflator opening. Some embodiments may further comprise an inflator coupling member at least partially received in the pocket, wherein the inflator coupling member is configured to receive a portion of an inflator, and wherein the inflator coupling member is further configured to allow the at least a portion of the inflator to be coupled with the airbag cushion in a preconfigured rotational orientation.

In some embodiments, the inflator coupling member may comprise a body portion defining a non-circular opening configured to be aligned with the inflator opening. In some embodiments, the inflator coupling member may further comprise at least one leg extending from the body portion. In some such embodiments, the pocket may be configured to receive the at least one leg to maintain the inflator coupling member in a preconfigured rotational orientation with respect to the airbag cushion. In some embodiments, the at least one leg may comprise two opposing legs. In some such embodiments, at least one of the two opposing legs (in some cases, both) may comprise a barb configured to prevent the at least one of the two opposing legs from being removed from the pocket.

In some embodiments, one or both of the opposing legs may be configured to be positioned in a first configuration, and second configuration, with respect to the body portion. In some such embodiments, one or both of the opposing legs may be resiliently biased towards the first configuration.

Some embodiments may comprise a second fabric layer. In some such embodiments, the pocket may be formed at least in part by the first fabric layer and the second fabric layer such that the inflator coupling member may be at least partially positioned in between the first fabric layer and the second fabric layer. In some embodiments, the second fabric layer and, in some such embodiments, additional fabric layers, may be provided by a patch applied adjacent to an inflator opening of the cushion.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to airbag cushion assemblies comprising cushion to inflator mounting and/or orientation features. More particularly, in some embodiments and implementations, an inflator coupling member, such as a rigid insert, may be coupled with an airbag cushion. In some embodiments and implementations, this may be done by inserting one or more legs of the inflator coupling member into a pocket formed in a throat region of the cushion. In some embodiments and implementations, the inflator coupling member may be sewn between fabric layers of the cushion and/or coupled with the cushion using one or more fasteners, such as tacks, rivets, etc. In preferred embodiments, the inflator coupling member may be configured to prevent an inflator from being coupled to the cushion in a non-desired rotational orientation. Thus, in some such embodiments, the inflator coupling member may comprise a non-circular opening configured to mate with a component, such as a collar, of an inflator that has a non-circular, cross-sectional shape.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
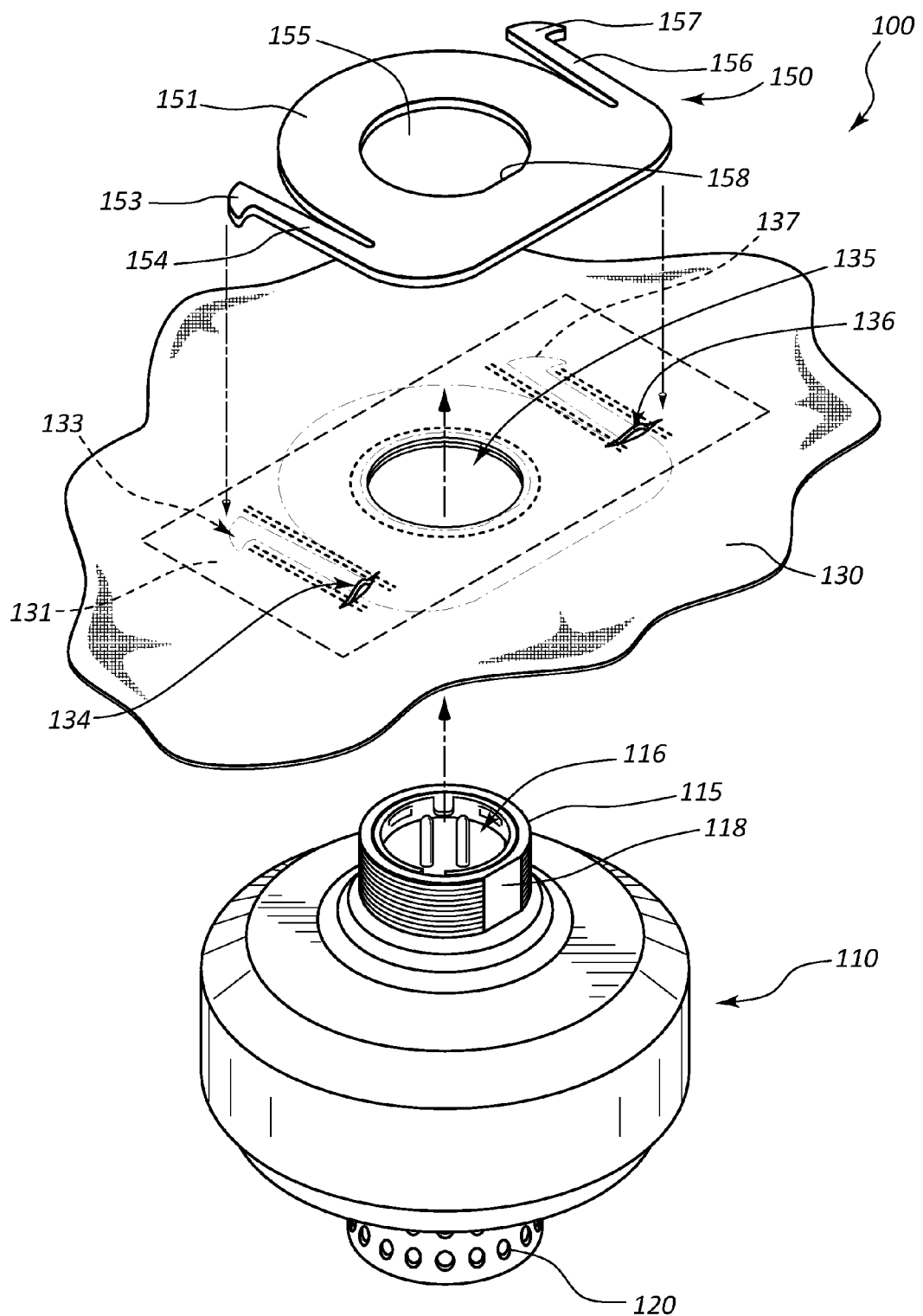
FIG. 1 is an exploded perspective view of an airbag cushion assembly according to some embodiments.

FIG. 1 depicts an airbag cushion assembly 100 according to some embodiments. Airbag cushion assembly 100 comprises an inflator 110, an airbag cushion 130, and an inflator coupling member 150.

Inflator 110 comprises a base 115 that may be configured to be received in an opening 135 formed within airbag cushion 130. In the depicted embodiment, base 115 comprises an inflator collar that may be used to couple inflator 110 with one or more other components of an airbag assembly, such as airbag cushion 130, an airbag module housing or other housing, or an adapter, for example. In some embodiments, inflator collar 115 may comprise a metal collar. In some embodiments, inflator collar 115 may be configured to at least partially house an initiator 116 within the inflator collar 115. In some such embodiments, inflator collar 115 may fully house an initiator 116 therein. Inflator 110 further comprises a diffuser 120 that may extend from an opposite side of inflator 110 relative to inflator collar 115.

In some embodiments, inflator collar 115 may comprise an at least substantially cylindrical shape having an at least substantially circular cross-sectional shape. However, in certain preferred embodiments, inflator collar 115 may have an exterior surface that comprises a non-circular cross-sectional shape, as discussed in greater detail below. In the embodiment of FIG. 1, inflator collar 115 comprises a flattened region 118 along a portion of its exterior surface. Thus, the outer surface of inflator collar 115 at least substantially comprises a "D shape" in cross section. However, in alternative embodiments, other shapes may be used, such as polygons and the like. As discussed below, certain preferred embodiments may comprise any shape that may allow for orientation in one or more preferred rotational orientations, such as a non-circular shape, may be used.

In some such embodiments, including the embodiment depicted in FIG. 1, the shape of collar 115 and/or a corresponding opening 155 of inflator coupling member 150, and/or one or more features formed on inflator 110 and/or inflator coupling member 150, may be configured to restrict coupling between airbag cushion 130 and inflator 110 to only a single desired rotational orientation. Thus, in the depicted embodiment, opening 155 comprises a flattened region 158 corresponding with flattened region 118 of inflator collar 115 to facilitate such coupling.

In some embodiments, inflator 110 may comprise an inflator comprising a composite fiber overwrap. Such inflators are disclosed, for example, in U.S. Pat. No. 8,297,653 titled "Pyrotechnic Inflator with Composite Overwrap," the entire contents of which are hereby incorporated by reference herein. However, it should be understood that the concepts disclosed herein may be applicable to a wide variety of other inflators.

Airbag cushion 130 comprises a throat region configured to receive inflator 110 through inflator opening 135. More particularly, inflator collar 115 is configured to extend through inflator opening 135. As alluded to above, inflator collar 115 may also be configured to extend through other openings, such as a housing opening (not illustrated in figures) to allow for mounting the inflator 110 to various components of an airbag assembly 100.

Airbag cushion 130 may further comprise one or more components to facilitate coupling of inflator coupling member 150 thereto. Thus, in the embodiment of FIG. 1, airbag cushion 130 comprises a first pocket 134 and a second pocket 136. Pockets 134 and 136 are configured to receive elements from inflator coupling member 150 to provide for a secure coupling between inflator 110 and airbag cushion 130 and to prevent relative rotation between these two components of assembly 100.

More particularly, inflator coupling member 150 comprises a first leg 154 and a second leg 156. Legs 154 and 156 are configured to be received in pockets 134 and 136, respectively. Legs 154 and 156 each comprises a respective barb (barbs 153 and 157, respectively) at its distal end. Pockets 134 and 136 each comprises a respective distal tip (133 and 137, respectively). Tips 133 and 137 may be configured to receive barbs 153 and 157, respectively, so as to prevent their respective legs 154/156 from being withdrawn from pockets 134/136. In some embodiments, pockets 134/136 may be sewn solely in parallel sew lines such that tips 133/137 may simply comprise the end of pockets 134/136. In such embodiments, the terminal end of one of the sew lines in each pocket may comprise the feature upon which barbs 153/157 catch to hold inflator coupling member 150 in place.

In some embodiments, one or both of pockets 134/136 may be coupled with airbag cushion 130 by applying a patch 131 to the region of airbag cushion adjacent to opening 135. In some such embodiments, patch 131 and/or the material defining pockets 134/136 may comprise the same material, or a similar material, as the material making up airbag cushion 130, such as a fabric material. Patch 131 and/or pockets 134/136 may be coupled with airbag cushion 130 by sewing or tacking, for example, patch 131 to airbag cushion 130. In other embodiments, one or more pockets, such as pockets 134/136, and/or another means for affixing an inflator coupling member to an airbag cushion may instead be manufactured directly into an airbag cushion rather than applying a patch.

Inflator coupling member 150 further comprises a body portion 151 positioned in between legs 154 and 156. Body portion 151 defines a centrally-located opening 155. Opening 155 preferably comprises a non-circular shape, which shape may match or at least generally correspond with a cross-sectional shape of an element of inflator 110, such an inflator collar 115. In this manner, engagement between inflator collar 115 and inflator coupling member 150, and therefore between inflator 110 and airbag cushion 130, may only be allowed in one rotational orientation, which may be useful in preventing improper coupling/orientation between airbag cushion 130 and inflator 110 during assembly. In other embodiments, however, the shapes of inflator collar 115 and/or another element of inflator 110 and opening 155 and/or another element of inflator coupling member 150 may be configured to allow for a plurality of preconfigured rotational orientations (and thereby prevent inflator 110 from being coupled with airbag cushion 130 in at least one non-desired rotational orientation). Inflator coupling member 150 is an example of a means for restricting a rotational orientation of an inflator with respect to an airbag cushion.

Inflator coupling member 150 is preferably made up of a material having a greater stiffness than a material defining airbag cushion 130, which is typically a fabric material. Thus, in some embodiments, inflator coupling member 150 may comprise, for example, a rigid plastic material, a metal material, a composite material, or any other material with sufficient rigidity/stiffness to allow for providing a positive engagement between the inflator coupling member 150 and a portion of an inflator 110.

In some embodiments, one or both of legs 154/156 may be configured to be positioned in a first configuration with respect to body portion 151 of inflator coupling member 150, and a second configuration distinct from the first configuration with respect to body portion 151. In some such embodiments, one or both of legs 154/156 may be resiliently biased towards the first configuration. Thus, in the depicted embodiment, legs 154 and 156 are configured to be flexed towards body portion 151 and opening 155 during installation. In this manner, legs 154/156 may extend through pockets 134/136 and then spring back towards their natural position in which barbs 153/157 have extended into tips 133/137 of pockets 134/136 and have engaged a portion of pockets 134/136 defining tips 133/137 to prevent, or at least inhibit, withdrawal of legs 154/156 from their respective pockets 134/136.

In some embodiments, pockets 134/136 may be angled with respect to one another at a distinct angle with respect to legs 154/156 to further facilitate the flexing of legs 154/156 during assembly. Thus, in some embodiments, legs 154 and/or 156 may be configured to flex from the first configuration in which one or both of legs 154/156 extend at a first distance from body portion 151 to the second configuration in which one or both of legs 154/156 extend at a second, lesser distance from body portion 151.

Figure 2A:
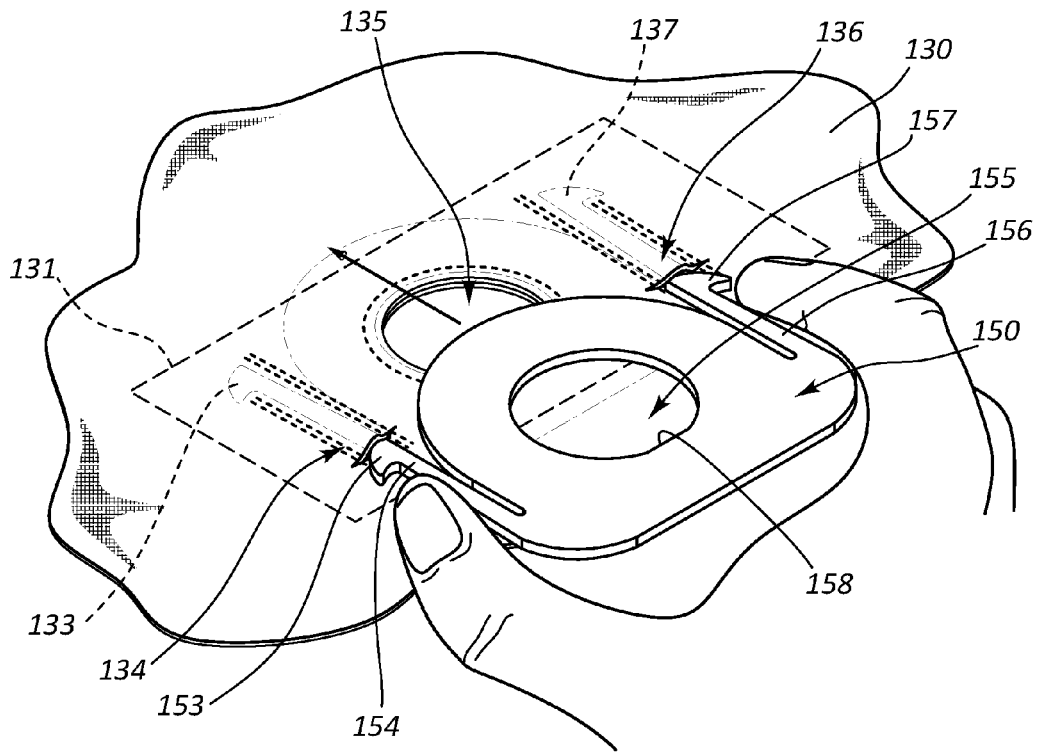
FIG. 2A is a perspective view of an initial step in a process of assembling the airbag cushion assembly of FIG. 1.

FIGS. 2A-20 depict the airbag assembly 100 of FIG. 1 during assembly. More particularly, FIG. 2A depicts inflator coupling member 150 being coupled with airbag cushion 130 by inserting legs 154 and 156 into pockets 134 and 136, respectively. As also illustrated in this figure, legs 154 and 156 may be pinched inwardly toward opening 155 during this insertion step such that barbs 153/157 resiliently expand back to their respective natural positions once barbs 153/157 have entered tips 133/137.

Figure 2B:
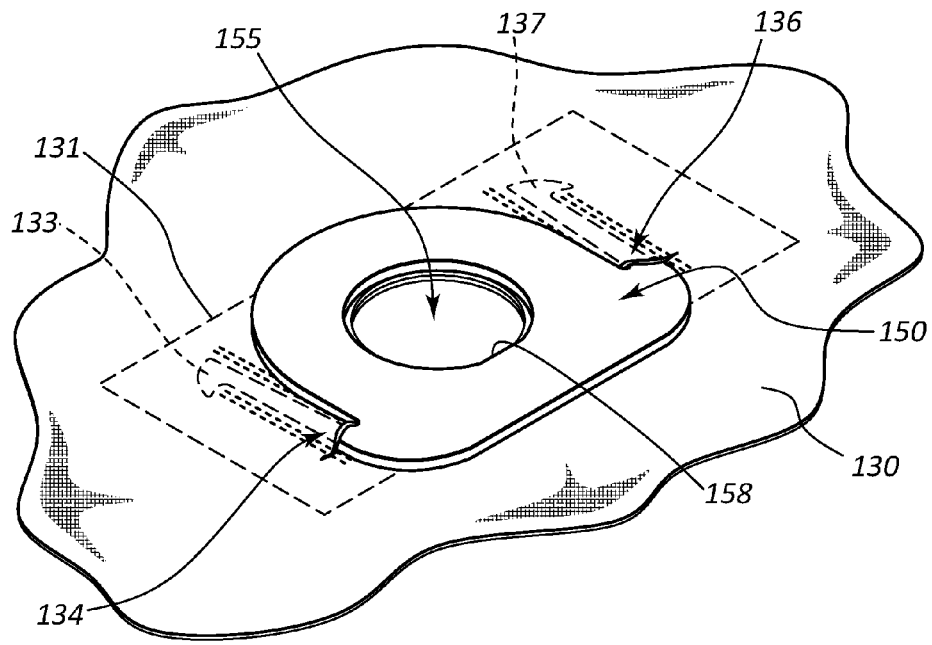
FIG. 2B is a perspective view showing the airbag cushion assembly of FIG. 1 after an inflator coupling member has been affixed to the airbag cushion.
Figure 2C:
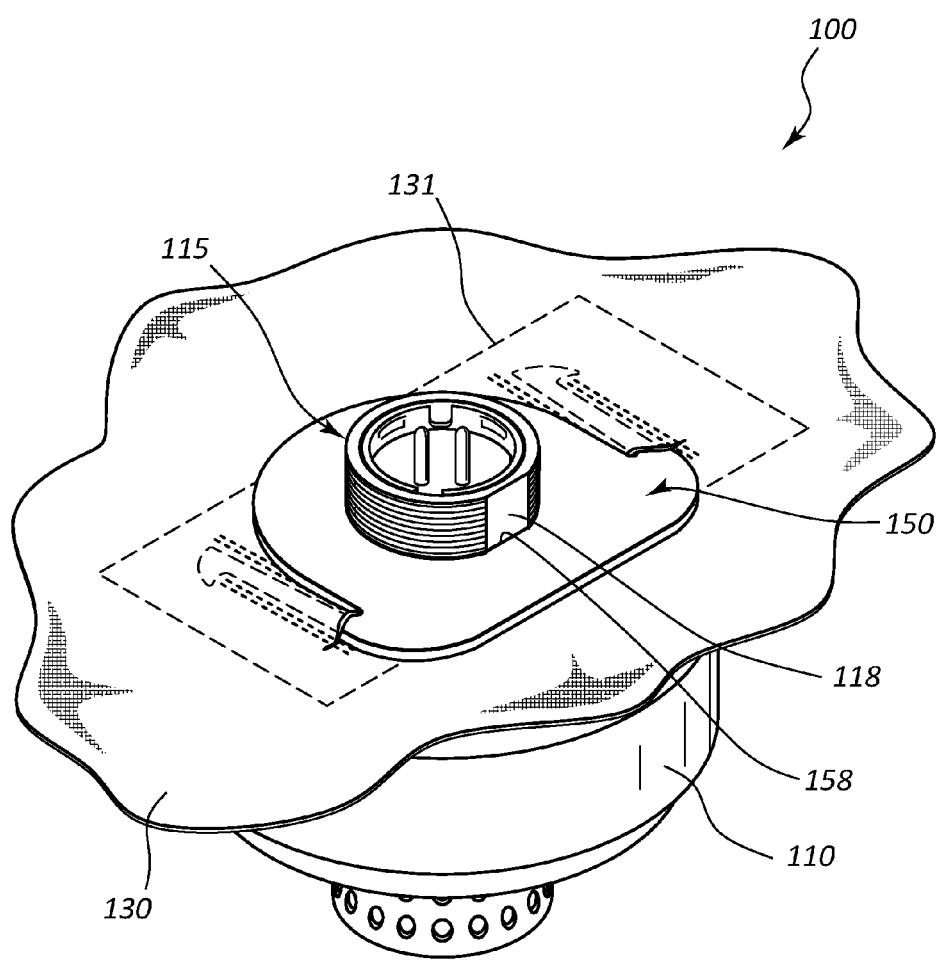
FIG. 2C is a perspective view of the airbag cushion assembly of FIG. 1 after the inflator has been coupled with the airbag cushion and inflator coupling member.

FIG. 2B depicts assembly 100 after inflator coupling member 150 has been coupled with airbag cushion 130 with legs 154 and 156 fully inserted into pockets 134 and 136, respectively. FIG. 2O depicts assembly 100 after inflator collar 115 of inflator 110 has been inserted through opening 155 in inflator coupling member 150. Because of the interface between flattened region 118 on inflator collar 115 and flattened region 158 of opening 155 in inflator coupling member 150, rotation between inflator 110 and airbag cushion 130 and inflator coupling member 150 is prevented. In addition, in this manner, inflator 110 is restricted to being coupled with airbag cushion 130 at only one rotational orientation.

Although FIG. 2B depicts inflator coupling member 150 being coupled with an exterior surface of airbag cushion 130, those of ordinary skill in the art will appreciate that, in alternative embodiments, the inflator coupling member 150 may instead be coupled to an interior surface of airbag cushion 130 if desired.

Figure 3:
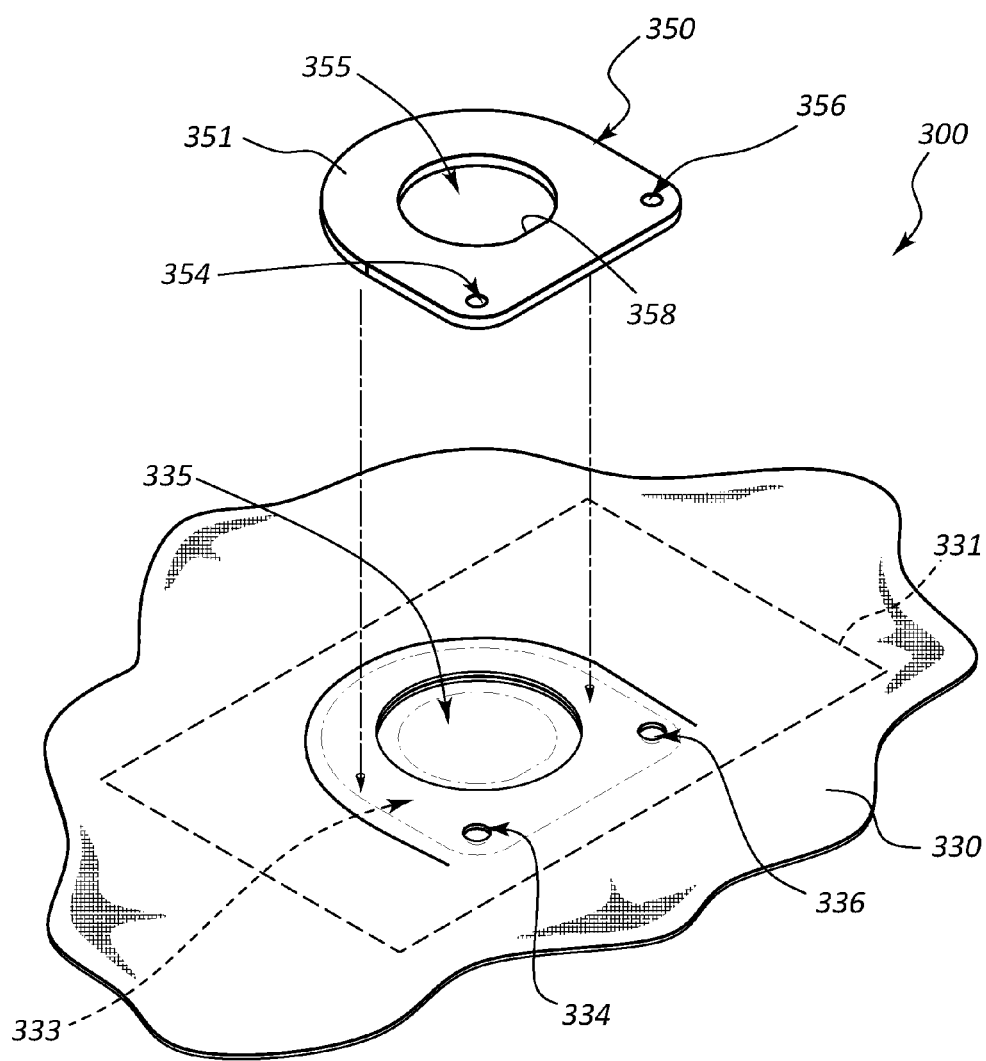
FIG. 3 is an exploded perspective view of another airbag cushion assembly according to other embodiments.

FIG. 3 is an exploded perspective view of another embodiment of an airbag cushion assembly 300. Airbag cushion assembly 300 comprises an airbag cushion 330 and an inflator coupling member 350. Although an inflator is not shown in this figure, it should be understood that airbag cushion assembly 300 will also include an inflator, such as, for example, the inflator 110 shown in FIGS. 1 and 2O. Inflator coupling member 350 is another example of a means for restricting a rotational orientation of an inflator with respect to an airbag cushion.

Figure 4A:
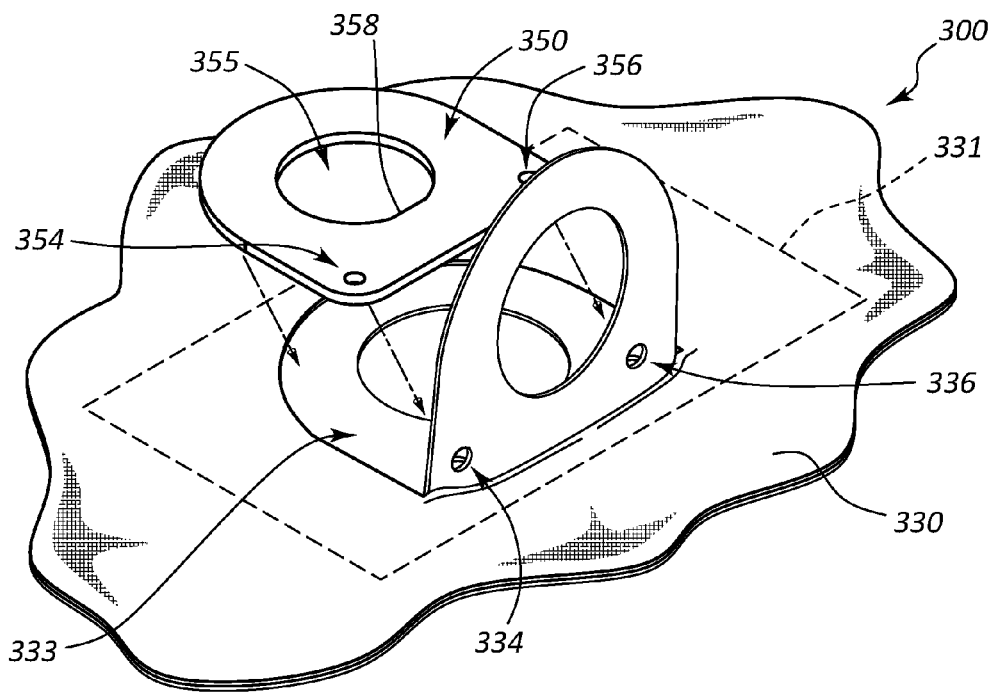
FIG. 4A is a perspective view of an initial step in a process of assembling the airbag cushion assembly of FIG. 3.
Figure 4B:
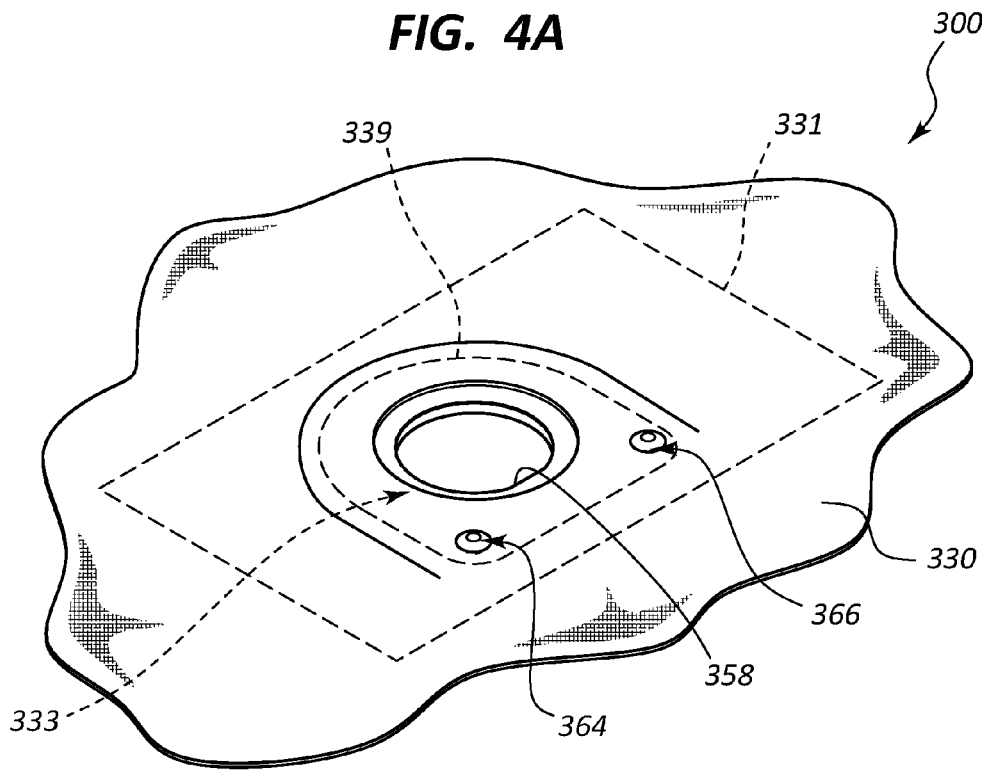
FIG. 4B is a perspective view showing the airbag cushion assembly of FIG. 3 after an inflator coupling member has been affixed to the airbag cushion.

Inflator coupling member 350, like inflator coupling member 150, comprises an insert. However, inflator coupling member 350 lacks legs. Instead, inflator coupling member 350 may be affixed or otherwise coupled adjacent to inflator opening 335 in airbag cushion 330 by inserting inflator coupling member 350 in pocket 333, as illustrated in FIG. 4A and/or by use of fasteners 364/366, such as rivets or the like, as illustrated in FIG. 4B. Fasteners 364/366 may extend through openings 354 and 356 formed in inflator coupling member 350. Similar openings 334/336 may be formed in airbag cushion 330 if desired. Of course, any number of fasteners may be used as needed.

In addition, in some embodiments, fasteners may be omitted in favor of other means for non-rotatably coupling inflator coupling member 350 to airbag cushion 330. For example, as an alternative to fasteners 364/366, or in addition to fasteners 364/366, pocket 333, which may be formed in a patch 331 sewn or otherwise attached to airbag cushion 330, may be sewn closed after inflator coupling member 350 has been inserted therein, as indicated by sew line 339. In this manner, inflator coupling member 350 may be sandwiched in between two adjacent layers of fabric on airbag cushion 330.

However, still other embodiments are contemplated in which inflator coupling member 330 may be coupled to airbag cushion 330 in other ways. For example, in some embodiments, an inflator coupling member may be inserted into a pre-formed pocket or other feature such that a subsequent sew operation is not needed.

Inflator coupling member 350 is otherwise quite similar to inflator coupling member 150. For example, opening 355 of inflator coupling member 350 is configured to restrict coupling between airbag cushion 330 and an inflator (not shown) to only a single desired rotational orientation. Thus, in the depicted embodiment, opening 355 comprises a flattened region 358 corresponding with a flattened region of a portion of an inflator, such as an inflator base or collar, to facilitate such coupling. In some embodiments, the geometry of inflator coupling member 350 and/or pocket 333 may be configured to similarly prevent improper orientation between inflator coupling member 350 and airbag cushion 330. Alternatively, certain features or alignment aids may be provided for this purpose. With respect to airbag assembly 300, the perimeter or profile of inflator coupling member may be non-circular and may match that of pocket 333 for this purpose.

Figure 5:
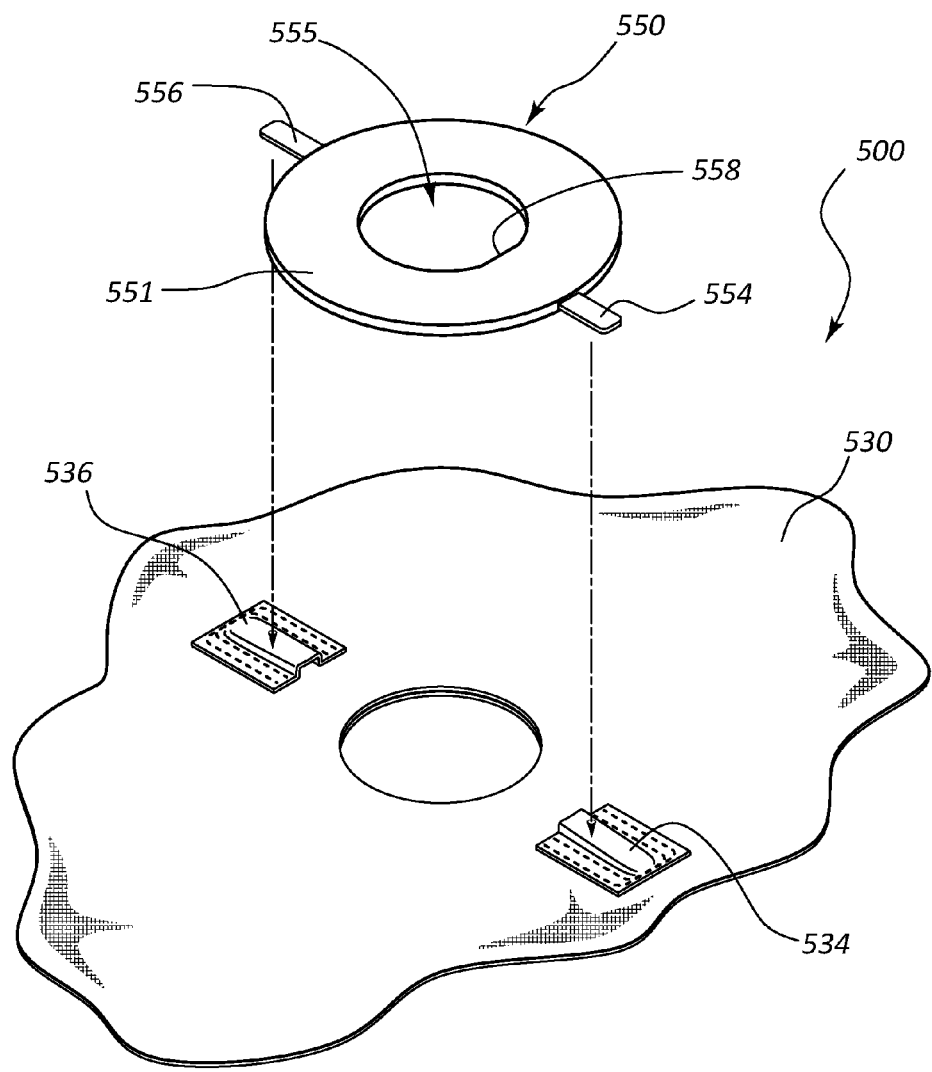
FIG. 5 is an exploded perspective view of yet another embodiment of an airbag cushion assembly.

FIG. 5 is an exploded perspective view of yet another embodiment of an airbag cushion assembly 500. Airbag cushion assembly 500 comprises an airbag cushion 530 and an inflator coupling member 550. Although an inflator is not shown in this figure, it should be understood that airbag cushion assembly 500 will also include an inflator, such as, for example, the inflator 110 shown in FIGS. 1 and 2O. Inflator coupling member 550 is still another example of a means for restricting a rotational orientation of an inflator with respect to an airbag cushion.

Inflator coupling member 550 comprises opposing legs 554 and 556 that extends from opposite ends of a body portion 551 of inflator coupling member 550. Legs 554 and/or 556 may be configured to be positioned in a first configuration with respect to body portion 551 of inflator coupling member 550, and a second configuration distinct from the first configuration with respect to body portion 551. In some such embodiments, one or both of legs 554/556 may be resiliently biased towards the first configuration.

Thus, in some embodiments, legs 554 and 556 may be spring-loaded between the configuration depicted in FIG. 5 and a configuration in which legs 554 and/or 556 are retracted into body portion 551. As such, legs 554/556 may be retracted to allow for insertion in pockets 534/536 and then may be configured to spring back towards their natural position to allow legs 554/556 to extend into pockets 534/536 and thereby prevent, or at least inhibit, withdrawal of legs 554/556 from their respective pockets 534/536.

Inflator coupling member 550 is otherwise quite similar to the other inflator coupling members disclosed herein. For example, opening 555 of inflator coupling member 550 is configured to restrict coupling between airbag cushion 530 and an inflator (not shown) to only a single desired rotational orientation. Thus, in the depicted embodiment, opening 555 comprises a flattened region 558 corresponding with a flattened region of a portion of an inflator, such as an inflator base or collar, to facilitate such coupling.

Figure 6:
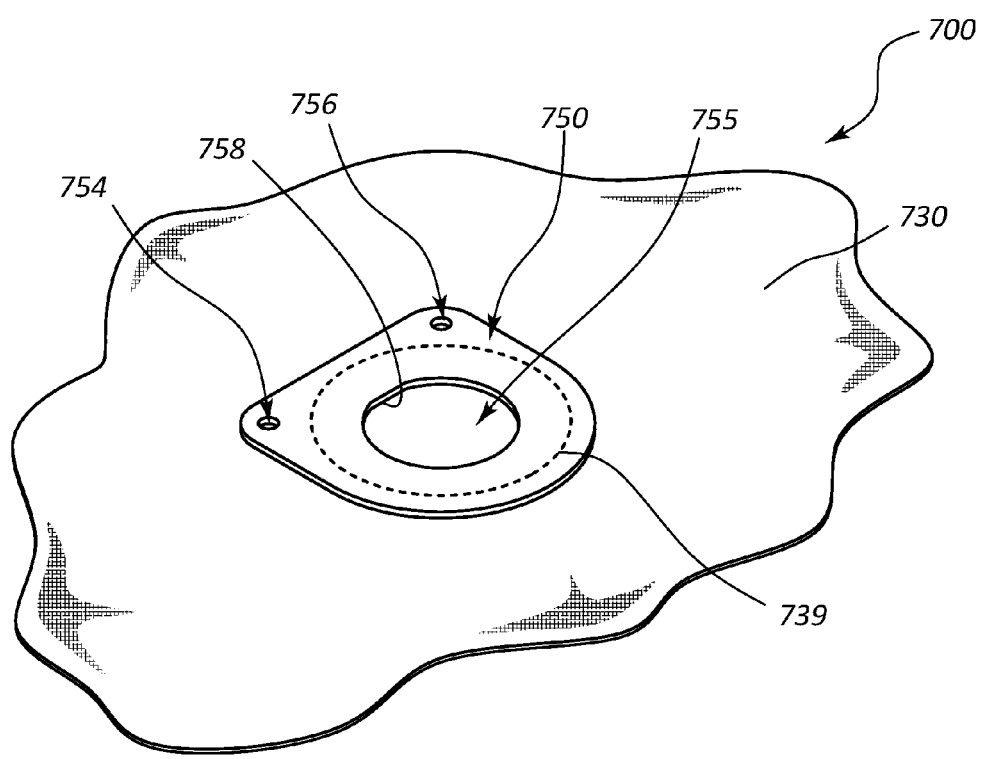
FIG. 6 is a perspective view of an airbag cushion assembly according to still other embodiments.

FIG. 6 depicts yet another alternative embodiment of a of an airbag cushion assembly 700. Airbag cushion assembly 700 comprises an airbag cushion 730 and an inflator coupling member 750. Although an inflator is not shown in this figure, it should be understood that airbag cushion assembly 700 may also include an inflator, such as, for example, the inflator 110 shown in FIGS. 1 and 2O. Inflator coupling member 750 is another example of a means for restricting a rotational orientation of an inflator with respect to an airbag cushion.

Inflator coupling member 750 comprises an insert. However, inflator coupling member 750 may be affixed or otherwise coupled in a throat region of airbag cushion 730 adjacent to an inflator opening without use of a pocket. Instead, inflator coupling member 750 is coupled directly to airbag cushion 730. This may be done, for example, by way of stitching, tacking, adhesives, or the like. In the depicted embodiment, a sew line 739 is used to sew/stitch through the inflator coupling member 750 and into the material of the cushion 730. In certain preferred embodiments, inflator coupling member 750 may be sewn to a throat region of airbag cushion 730 about an inflator opening (at least partially overlapping with opening 755 in inflator coupling member 750) on an exterior surface of airbag cushion 730. However, other embodiments are contemplated in which inflator coupling member 750 may instead be sewn or otherwise coupled with an interior surface of airbag cushion 730 or, as mentioned above, may be sandwiched between adjacent layers of airbag cushion 730 in the throat region.

One or more openings, such as openings 754 and/or 756 may be formed in inflator coupling member 750. Similar openings may be formed in airbag cushion 730 if desired. Openings 754 and/or 756 may be used as locating/orientation features to allow an operator or machine to verify that inflator coupling member 750 has been positioned in the desired location and with the desired rotational orientation with respect to airbag cushion 730. In this manner, a feature of opening 755, such as flattened region 758, may be used to ensure a desired rotational orientation of the inflator coupling member 750 and corresponding inflator (not shown in FIG. 6) with respect to the airbag cushion 730.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
   an airbag cushion comprising a throat region, wherein the throat region comprises an inflator opening;
   an inflator comprising an inflator collar, wherein the inflator is coupled with the airbag cushion, wherein the inflator collar comprises a non-circular shape, and wherein the inflator collar extends through the inflator opening;
   an inflator coupling member coupled with the airbag cushion at the inflator opening, wherein the inflator coupling member comprises an opening configured to be aligned with the inflator opening, and wherein the opening comprises a non-circular shape configured to mate with the non-circular shape of the inflator collar so as to prevent the inflator from being coupled with the airbag cushion in a non-desired rotational orientation; and
   a pocket configured to receive at least a portion of the inflator coupling member.

2. The airbag cushion assembly of claim 1, wherein the inflator coupling member comprises a material having a stiffness greater than a material defining the airbag cushion.

3. The airbag cushion assembly of claim 1, wherein the pocket is formed by adjacent layers of a fabric material of the airbag cushion.

4. The airbag cushion assembly of claim 3, wherein the inflator coupling member comprises at least one leg, and wherein the pocket is configured to receive the at least one leg to maintain the inflator coupling member in a preconfigured rotational orientation with respect to the airbag cushion.

5. The airbag cushion assembly of claim 4, wherein the inflator coupling member comprises two opposing legs, wherein the pocket comprises a first region configured to receive a first leg of the two opposing legs, and wherein the pocket comprises a second region configured to receive a second leg of the two opposing legs.

6. The airbag cushion assembly of claim 4, wherein the at least one leg comprises a barb, and wherein the pocket comprises a barb-receiving portion configured to receive the barb to prevent the at least one leg from being removed from the pocket.

7. The airbag cushion assembly of claim 6, wherein the at least one leg is configured to be positioned in a first configuration with respect to a body of the inflator coupling member, wherein the at least one leg is configured to be positioned in a second configuration with respect to the body, and wherein the at least one leg is resiliently biased towards the first configuration.

8. The airbag cushion assembly of claim 7, wherein the at least one leg is configured to flex from the first configuration in which the at least one leg extends at a first distance from the body to the second configuration in which the at least one leg extends at a second distance from the body, wherein the first distance is greater than the second distance.

9. The airbag cushion assembly of claim 1, wherein the inflator coupling member is coupled with the airbag cushion using at least one of a sew line and an adhesive.

10. An airbag cushion assembly, comprising:
    an airbag cushion comprising an opening;
    an inflator coupled with the airbag cushion, wherein only a portion of the inflator is configured to be received in the opening; and
    means for restricting a rotational orientation of the inflator with respect to the airbag cushion, wherein the means for restricting a rotational orientation of the inflator with respect to the airbag cushion is configured to allow the portion of the inflator to be coupled with the airbag cushion in a preconfigured rotational orientation, and wherein the means for restricting a rotational orientation of the inflator with respect to the airbag cushion lacks radial symmetry.

11. The airbag cushion assembly of claim 10, wherein the means for restricting a rotational orientation of the inflator with respect to the airbag cushion comprises an inflator coupling member coupled with the airbag cushion at the opening.

12. The airbag cushion assembly of claim 11, wherein the inflator coupling member comprises an insert, wherein the insert comprises an insert opening configured to be aligned with the opening of the airbag cushion, wherein the insert opening comprises a non-circular shape, and wherein the at least a portion of the inflator comprises a non-circular shape configured to mate with the non-circular shape of the insert opening so as to prevent the inflator from being coupled with the airbag cushion in a non-desired rotational orientation.

13. The airbag cushion assembly of claim 12, wherein the airbag cushion comprises a pocket configured to receive at least a portion of the insert.

14. The airbag cushion assembly of claim 10, wherein the means for restricting a rotational orientation of the inflator with respect to the airbag cushion is stitched to the airbag cushion about the opening.

15. An airbag cushion, comprising:
a first fabric layer;
an inflator opening formed in the first fabric layer;
a pocket formed at least in part by the first fabric layer, wherein the pocket is formed adjacent to the inflator opening; and
an inflator coupling member at least partially received in the pocket, wherein the inflator coupling member is configured to receive a portion of an inflator, and wherein the inflator coupling member is further configured to allow the at least a portion of the inflator to be coupled with the airbag cushion in a preconfigured rotational orientation.

16. The airbag cushion of claim 15, wherein the inflator coupling member comprises a body portion defining a non-circular opening configured to be aligned with the inflator opening.

17. The airbag cushion of claim 16, wherein the inflator coupling member further comprises at least one leg extending from the body portion, wherein the pocket is configured to receive the at least one leg to maintain the inflator coupling member in a preconfigured rotational orientation with respect to the airbag cushion.

18. The airbag cushion of claim 17, wherein the at least one leg comprises two opposing legs, wherein at least one of the two opposing legs comprises a barb configured to prevent the at least one of the two opposing legs from being removed from the pocket.

19. The airbag cushion of claim 18, wherein both of the opposing legs are configured to be positioned in a first configuration with respect to the body portion, wherein both of the opposing legs are configured to be positioned in a second configuration with respect to the body portion, and wherein both of the opposing legs are resiliently biased towards the first configuration.

20. The airbag cushion of claim 15, further comprising a second fabric layer, wherein the pocket is formed at least in part by the first fabric layer and the second fabric layer such that the inflator coupling member is at least partially positioned in between the first fabric layer and the second fabric layer.

21. An airbag cushion assembly, comprising:
an airbag cushion comprising a throat region, wherein the throat region comprises an inflator opening;
an inflator comprising an inflator collar, wherein the inflator is coupled with the airbag cushion, wherein the inflator collar comprises a non-circular shape, and wherein the inflator collar extends through the inflator opening; and
an inflator coupling member coupled with the airbag cushion at the inflator opening, wherein the inflator coupling member comprises an opening configured to be aligned with the inflator opening, and wherein the opening comprises a non-circular shape configured to mate with the non-circular shape of the inflator collar so as to prevent the inflator from being coupled with the airbag cushion in a non-desired rotational orientation, and wherein the inflator coupling member is coupled with the airbag cushion using at least one of a sew line and an adhesive.

22. The airbag cushion assembly of claim 10, wherein the inflator is coupled with the airbag cushion such that only a base portion of the inflator is configured to be received in the opening.

23. The airbag cushion assembly of claim 22, wherein the inflator comprises an inflator collar, and wherein the inflator is coupled with the airbag cushion such that only the inflator collar is configured to be received in the opening.

24. The airbag cushion assembly of claim 10, wherein the means for restricting a rotational orientation of the inflator with respect to the airbag lacks radial symmetry about an axis of the opening.

\* \* \* \* \*